(12) United States Patent
Masuda et al.

(10) Patent No.: US 10,479,342 B2
(45) Date of Patent: Nov. 19, 2019

(54) ELECTRICALLY POWERED BRAKE DEVICE

(71) Applicant: NTN CORPORATION, Osaka (JP)

(72) Inventors: Yui Masuda, Iwata (JP); Tatsuya Yamasaki, Iwata (JP)

(73) Assignee: NTN CORPORATION, Osaka (JP)

( * ) Notice: Subject to any disclaimer, the term of this patent is extended or adjusted under 35 U.S.C. 154(b) by 29 days.

(21) Appl. No.: 15/825,936

(22) Filed: Nov. 29, 2017

(65) Prior Publication Data

US 2018/0079403 A1 Mar. 22, 2018

Related U.S. Application Data

(63) Continuation of application No. PCT/JP2016/065766, filed on May 27, 2016.

(30) Foreign Application Priority Data

Jun. 1, 2015 (JP) .................................. 2015-111136

(51) Int. Cl.
*B60T 17/22* (2006.01)
*B60T 8/172* (2006.01)
(Continued)

(52) U.S. Cl.
CPC ............ *B60T 17/221* (2013.01); *B60T 8/172* (2013.01); *B60T 13/741* (2013.01); *F16D 65/18* (2013.01);
(Continued)

(58) Field of Classification Search
CPC ...... B60T 17/221; B60T 13/741; B60T 8/172; F16D 65/18; F16D 2121/24; F16D 66/00
See application file for complete search history.

(56) References Cited

U.S. PATENT DOCUMENTS 8,430,213 B2  4/2013 Yokoyama et al.
9,429,487 B2  8/2016 Masuda et al.
(Continued)

FOREIGN PATENT DOCUMENTS

CN  101365893  2/2009
JP  2013-29413  2/2013
(Continued)

OTHER PUBLICATIONS

English Language Translation of the International Preliminary Report on Patentability dated Dec. 14, 2017 in corresponding International Patent Application No. PCT/JP2016/065766.
(Continued)

*Primary Examiner* — Vishal R Sahni

(57) ABSTRACT

The electric brake device includes an electric motor, a friction member operator, a friction member, a brake rotor, and a control device. A braking force estimator provided in the control device includes: a direct estimator configured to convert output of a braking force sensor which detects a load or displacement corresponding amount, to a braking force; and an indirect estimator configured to estimate the braking force on the basis of information other than output of the braking force sensor. A range in which the braking force is estimated by the direct estimator is a specified low-braking-force range, and in a range beyond this range, estimation of the braking force is performed by the indirect estimator.

6 Claims, 7 Drawing Sheets

(51) Int. Cl.
*B60T 13/74* (2006.01)
*F16D 65/18* (2006.01)
*F16D 66/00* (2006.01)
*F16D 121/24* (2012.01)

(52) U.S. Cl.
CPC ........ F16D 66/00 (2013.01); *F16D 2066/005* (2013.01); *F16D 2121/24* (2013.01)

(56) References Cited

U.S. PATENT DOCUMENTS

| | | | |
|---|---|---|---|
| 9,482,587 | B2 | 11/2016 | Masuda et al. |
| 9,505,385 | B2* | 11/2016 | Yasui .................... F16D 55/225 |
| 9,528,889 | B2 | 12/2016 | Masuda |
| 9,599,523 | B2 | 3/2017 | Masuda |
| 9,604,622 | B2 | 3/2017 | Yasui et al. |
| 9,752,634 | B2 | 9/2017 | Yasui et al. |
| 2007/0138861 | A1* | 6/2007 | Kawahara ............ B60T 13/741 303/20 |
| 2009/0218179 | A1 | 9/2009 | Yokoyama et al. |
| 2014/0191627 | A1 | 7/2014 | Takahashi et al. |
| 2014/0224038 | A1 | 8/2014 | Masuda et al. |
| 2014/0283635 | A1 | 9/2014 | Masuda et al. |
| 2015/0204736 | A1 | 7/2015 | Masuda |
| 2015/0300433 | A1 | 10/2015 | Yasui et al. |
| 2015/0355038 | A1 | 12/2015 | Masuda |
| 2016/0001752 | A1* | 1/2016 | Yasui .................... F16D 55/225 701/70 |
| 2016/0031427 | A1 | 2/2016 | Yasui et al. |

FOREIGN PATENT DOCUMENTS

| | | |
|---|---|---|
| JP | 2013-32970 | 2/2013 |
| JP | 2013-83550 | 5/2013 |
| JP | 2013-257000 | 12/2013 |
| JP | 2014-16307 | 1/2014 |
| JP | 2014-101960 | 6/2014 |
| JP | 2014-134450 | 7/2014 |
| JP | 2014-177204 | 9/2014 |
| JP | 2014-177206 | 9/2014 |
| JP | 2014-177207 | 9/2014 |
| WO | WO2014142336 | * 9/2014 |

OTHER PUBLICATIONS

Notification of Reason(s) for Rejection dated Nov. 22, 2016 in corresponding Japanese Patent Application No. 2015-111136.
Decision of Grant dated Apr. 4, 2017 in corresponding Japanese Patent Application No. 2015-111136.
International Search Report dated Jul. 5, 2016 in corresponding International Patent Application No. PCT/JP2016/065766.
Extended European Search Report dated Dec. 6, 2018 in corresponding European Application 16803265.4.
Chinese Office Action dated May 17, 2019 in Chinese Patent Application No. 201680031348.4.

* cited by examiner $F_r$ : TARGET BRAKING FORCE
$F_{bmax}$ : ESTIMATED BRAKING FORCE
$\theta_{sw}$ : MOTOR ROTATION ANGLE AT $F_{bmax}$
$\theta$ : MOTOR ROTATION ANGLE
$f(\theta)$ : MOTOR ROTATION ANGLE-TO-BRAKING FORCE CONVERSION FUNCTION $f_\theta(F)$: BRAKING FORCE-TO-MOTOR ROTATION ANGLE CONVERSION FUNCTION $f_c(F_r)$: BRAKING FORCE-TO-MOTOR CURRENT CONVERSION FUNCTION
$i_m$: MOTOR CURRENT

ELECTRICALLY POWERED BRAKE DEVICE

CROSS REFERENCE TO THE RELATED APPLICATION

This application is a continuation application, under 35 U.S.C. § 111(a), of international application No. PCT/JP2016/065766, filed May 27, 2016, which is based on and claims Convention priority to Japanese patent application No. 2015-111136, filed Jun. 1, 2015, the entire disclosure of which is herein incorporated by reference as a part of this application.

BACKGROUND OF THE INVENTION

Field of the Invention

The present invention relates to an electrically powered brake device or electric brake device having a function of estimating a braking force and mounted to a vehicle or the like.

Description of Related Art

An electric brake device is comprising a brake rotor, a friction member, a friction member operator formed from a speed-reducing mechanism and a linear motion mechanism and configured to bring the friction member into contact with the brake rotor, and an electric motor configured to drive the friction member operator. A friction force between the friction member and the brake rotor is controlled so as to generate an appropriate braking force in accordance with a driver's pedal operation amount (pedaling force magnitude, stroke, etc.) and a vehicle state. At this time, a braking force sensor for estimating the braking force is used in order to accurately control the braking force. Regarding the braking force sensor, there are proposals to use a magnetic sensor and a load sensor in Patent Documents 1 to 6.

RELATED DOCUMENT

Patent Document

[Patent Document 1] JP Laid-open Patent Publication No. 2013-029413
[Patent Document 2] JP Laid-open Patent Publication No. 2013-032970
[Patent Document 3] JP Laid-open Patent Publication No. 2013-083550
[Patent Document 4] JP Laid-open Patent Publication No. 2013-257000
[Patent Document 5] JP Laid-open Patent Publication No. 2014-016307
[Patent Document 6] JP Laid-open Patent Publication No. 2014-134450

In general, vehicle brakes are often used at a deceleration of about 0.2 G or lower, for example, and at this time, the driver finely, or in detail, performs brake control by operating a pedal or the like in accordance with the vehicle behavior. Therefore, the braking force sensor is required to have a sufficient detection accuracy so as not to give an uncomfortable feeling to the driver. On the other hand, at the time of abrupt braking which requires a great vehicle deceleration, in general, the driver rarely performs fine or detailed control of the pedal in accordance with the feeling, and therefore it is considered that there is no problem even if the detection accuracy of the braking force sensor is comparatively low.

As estimator configured to estimate the braking force, the brake load sensor that detects an axial-direction load of the linear motion mechanism as shown in each Patent Document can be configured at a comparatively low cost and thus is useful. In this case, the electric brake device controls a pressing force between the friction member and the brake rotor. At this time, a friction coefficient between the friction member and the brake rotor varies by the temperature thereof. It is known that, for example, in such a case where intense braking is repeated from high-speed travelling, the friction coefficient can become about one third (brake fade). Therefore, the brake load sensor is required to have a wide dynamic range for detecting the pressing force considering the brake fade. However, as a result, it might be difficult to obtain a sufficient resolution in a normal-use region in which the brake fade does not occur.

As described above, if the braking force sensor is set to have a wide dynamic range considering situations that occur less frequently, it becomes necessary to configure a highly accurate load sensor for obtaining a sufficient resolution in the normal-use region, and this might lead to cost increase.

SUMMARY OF THE INVENTION

The present invention has been made to solve the above problem, and an object of the present invention is to provide an electric brake device that makes it easy to configure braking force estimator having a sufficient resolution in a normal-use region while having a wide dynamic range, and that enables control accuracy improvement and cost reduction.

Hereinafter, the present invention will be described, while referring to the reference characters in the embodiments for convenience sake in order to facilitate the understanding.

An electric brake device according to the present invention includes: a brake rotor 3; a friction member 4; a friction member operator 5 configured to bring the friction member 4 into contact with the brake rotor 3; an electric motor 6 configured to drive the friction member operator 5; a rotation angle estimator 8a configured to estimate a motor rotation angle of the electric motor 6; a braking force estimator 16 configured to estimate a braking force; and a control device 2 configured to control the braking force by use of the electric motor 6 so as to achieve a target braking force, wherein the braking force estimator 16 includes: a direct estimator 17 configured to convert, into an estimated braking force, output of a braking force sensor 19 which detects a load or displacement corresponding amount acting on one of the friction member 4, the friction member operator 5, and a member 7 supporting the friction member 4 or the friction member operator 5; and an indirect estimator 18 configured to estimate the braking force on the basis of information other than the output of the braking force sensor 19, and wherein a range in which the braking force is estimated by the direct estimator 17 is a specified low-braking-force range, and in a range beyond the specified low-braking-force range, estimation of the braking force is performed by the indirect estimator 18.

As used herein, the "load or displacement corresponding amount" refers to an amount including, as well as load and displacement, a physical quantity such as distortion which can be converted to load or displacement.

According to the above configuration, the braking force estimator 16 includes: the direct estimator 17 which uses the braking force sensor 19 for detecting the load or displacement corresponding amount caused by the braking force; and the indirect estimator 18, and the direct estimator 17 only has to perform detection in a specified low-braking-force range. Therefore, it is possible to obtain a configuration capable of performing highly accurate detection as the sensor element 19a, at low cost. In a range beyond the estimation range of the direct estimator 17, estimation of the braking force may be performed by the indirect estimator 18. In the case of applying such a great braking force as to exceed the estimation range of the direct estimator 17, a driver rarely performs fine or detailed control of a pedal in accordance with the feeling, and therefore there is no problem even if the detection accuracy of the braking force sensor 19 is comparatively low. Therefore, as for this range, the braking force sensor 19 for detecting the load or displacement corresponding amount is not needed, and estimation can be performed even from the motor rotation angle, the motor current, or the like. Accordingly, it becomes easy to configure the braking force estimator 16 having a sufficient resolution in a normal-use region while having such a wide dynamic range that allows detection of a pressing force considering the brake fade, for example, and it becomes possible to improve control accuracy and reduce the cost.

In the present invention, the indirect estimator 18 may estimate the braking force, using a specified relationship between the motor rotation angle and the braking force, on the basis of the motor rotation angle detected by the rotation angle estimator 8a. The braking force and the motor rotation angle of the electric motor 6 which operates the friction member 4 have a relationship specified to a certain extent. Therefore, by obtaining the relationship through examination, simulation, or the like in advance, it is possible to estimate the braking force on the basis of the motor rotation angle. In general, the rotation angle estimator 8a such as a rotation angle sensor configured to detect the motor rotation angle is provided accompanying the electric motor 6 for the purpose of motor control, and therefore such accompanying rotation angle estimator 8a may be used. Thus, the indirect estimator 18 can be obtained with a simple configuration.

In the present invention, the indirect estimator 18 may estimate the braking force, using a specified relationship between motor current of the electric motor 6 and the braking force, on the basis of a value of the motor current detected by a current sensor 8b. The braking force and the motor current of the electric motor 6 which operates the friction member 4 have a relationship specified to a certain extent. Therefore, by obtaining the relationship through examination, simulation, or the like in advance, it is possible to estimate the braking force on the basis of the motor current. As the current sensor 8b, there are many sensors that have simple configurations and are inexpensive, and therefore such sensors may be used. Thus, also in this case, the indirect estimator 18 can be obtained with a simple configuration.

In the present invention, the braking force sensor 19 used by the direct estimator 17 may detect an amount of displacement of one of the friction member 4, the friction member operator 5, and the member 7 supporting the friction member 4 or the friction member operator 5 due to a contact force between the friction member 4 and the brake rotor 3. Due to the contact force between the friction member 4 and the brake rotor 3, elastic deformation occurs at various parts of the electric brake device. The braking force sensor 19 detects such elastic deformation. As the sensor element 19a of the braking force sensor 19 for detecting the deformation, there are various sensor elements that can perform detection with high accuracy, though the detectable range is limited. By using such a sensor element 19a, it becomes possible to manufacture the direct estimator 17 capable of detecting the braking force with high accuracy, at low cost.

In the present invention, a calibrator 20 may be provided which is configured to perform calibration for the indirect estimator 18 on the basis of a relationship between the estimated braking force estimated by the direct estimator 17 and at least one of the motor rotation angle and motor current of the electric motor 6. The relationship, between the motor rotation angle, the motor current, or the like, and the braking force, can vary due to changes over time, etc. Therefore, by providing the calibrator 20 to perform calibration for the indirect estimator 18, accuracy of braking force estimation by the indirect estimator 18 can be always maintained. The calibrator 20 performs calibration using a braking force detected by the direct estimator 17 while the electric brake device is activated. Therefore, the calibration can be performed with high accuracy, and the estimated braking forces obtained by the direct estimator 17 and the indirect estimator 18 can be prevented from deviating from each other.

In the case where the calibrator 20 is provided, the following configuration may be employed: when a speed of a vehicle to which the electric brake device is mounted is equal to or smaller than a predetermined value, the electric motor 6 is activated not depending on a command from an operator of the vehicle, and calibration for the indirect estimator 18 is performed on the basis of the calibrator 20. If activation of the electric brake device for calibration is performed when the vehicle speed is equal to or smaller than a predetermined value, calibration can be performed without causing any obstacle to the vehicle travelling.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
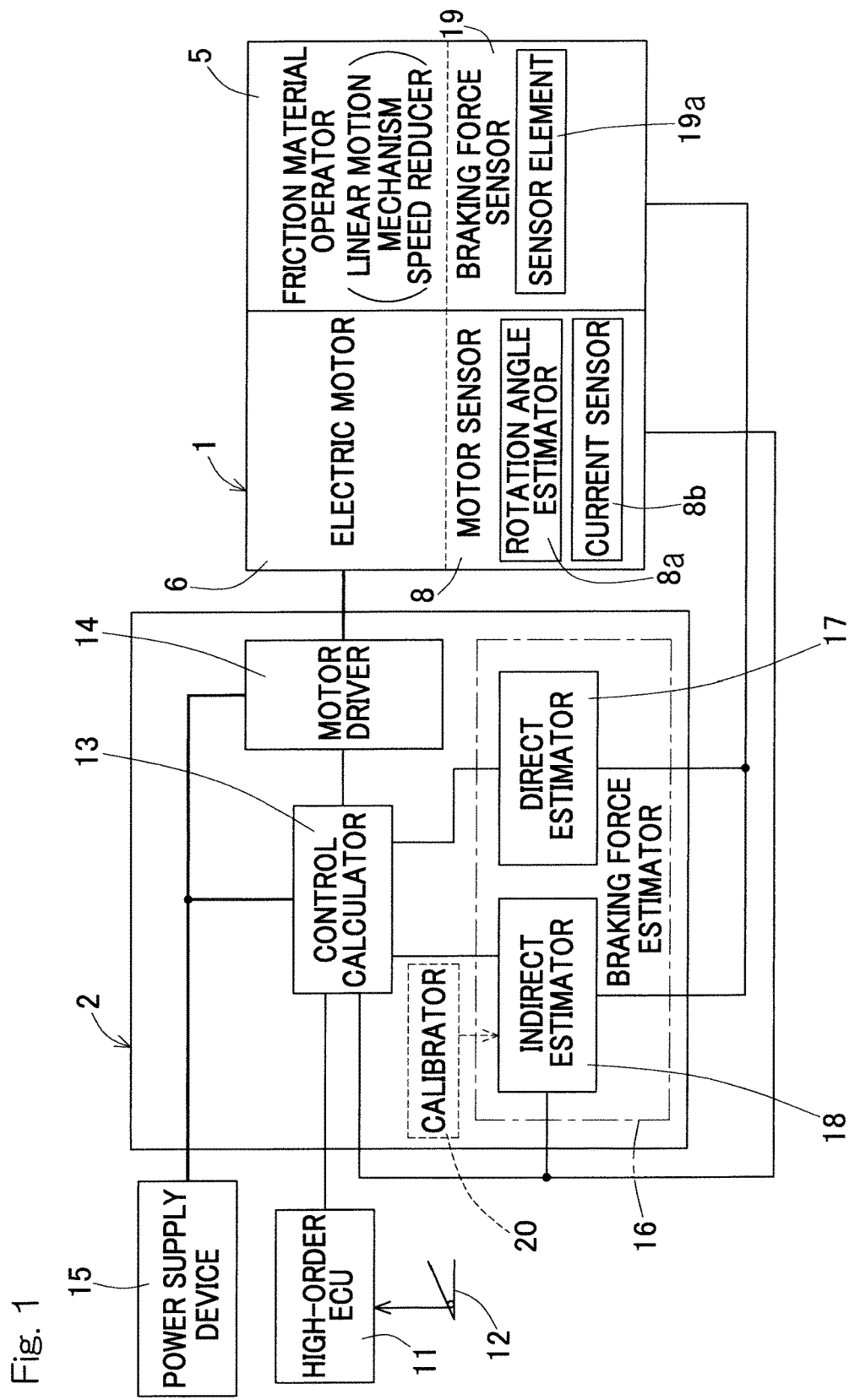
FIG. 1 is a block diagram of a conceptual configuration of an electric brake device according to an embodiment of the present invention.

An embodiment of the present invention will be described with reference to the drawings. This electric brake device includes: an electric brake actuator 1; a control device 2 for controlling the electric brake actuator 1; a brake rotor 3 exemplified in FIG. 8; and a pair of friction members 4, 4 arranged around the brake rotor 3 therebetween. Each friction member 4 is formed from a friction pad. In this example, the brake rotor 3 is formed from a brake disk, and rotates integrally with a wheel (not shown). The brake rotor 3 may be a brake drum. The electric brake actuator 1 includes a friction member operator 5 for bringing the friction member 4 into contact with the brake rotor 3, and an electric motor 6 for driving the friction member operator 5. The electric motor 6 is formed from an AC motor such as a three-phase synchronous motor or induction motor, a DC motor, or the like.

The friction member operator 5 is composed of a linear motion mechanism which converts a rotational input from the electric motor 6 via a speed-reducing mechanism or speed reducer (not shown), into a forward/backward linear motion of one of the friction members 4; and the like. The friction member operator 5 is provided to one opposing portion 7a of a pair of opposing portions 7a, 7b sandwiching the brake rotor 3 in the caliper body 7. One of the friction members 4 is attached to an end of the friction member operator 5, and the other friction member 4 is attached to the other opposing portion 7b of the caliper body 7. The caliper body 7 is provided movably in the axial direction of the brake rotor 3 relative to a mount (not shown) fixed to a knuckle (not shown) supporting the wheel. A specific structure example of the electric brake actuator 1 in FIG. 8 will be described later together with FIG. 9.

In FIG. 1, the electric motor 6 is provided with, as one of motor sensors 8, a rotation angle estimator 8a such as a rotation angle sensor for estimating a motor rotation angle, and a current sensor 8b.

The control device 2 is a device for controlling a braking force by the electric motor 6 so as to achieve a given target braking force, and is composed of: a microcomputer having a processor; other electronic circuits such as a ROM (Read Only Memory) having a program to be executed by the processor, a RAM (Random Access Memory), and a co-processor; and the like. A high-order ECU 11 (or another unit for commanding a braking force) generates, from the target braking force, a command value for each brake force and thus distributes the target value to each control device 2 of the electric brake devices for the respective wheels, in accordance with an operation amount of a brake operator 12 such as a brake pedal, using a look up table (LUT) realized by software or hardware, or a predetermined conversion function stored in a library of software (hereinafter, referred to as an "embodied model"). The control device 2 includes: a control calculator 13 which generates a driving command composed of a torque command or a rotation rate (or number of rotation per unit time) command in accordance with the target braking force; a motor driver 14 which converts the driving command outputted from the control calculator 13, to motor current, and applies the motor current to the electric motor 6. The control calculator 13 performs feedback control using an estimation value from a braking force estimator 16 described later. In the case where the control calculator 13 is configured to perform vector control, control for enhancing motor efficiency is performed using a motor rotation angle detected by the rotation angle estimator 8a. Specifically, the control calculator 13 is configured from a hardware circuit or a software function on a processor (not shown), that is capable of generating the torque command or the driving command and performing feedback control and further vector control, in response to inputs of the distributed target braking force, the estimation value, the motor rotation angle, and the like, using the embodied model. The motor driver 14 has, for example, a semiconductor bridge including FETs or IGBTs and the like, and controls motor current through PWM control. The control calculator 13 and the motor driver 14 are connected to a power supply device 15 such as a battery.

In the control device 2 having a basic configuration such as the above configuration, the braking force estimator 16 is composed of direct estimator 17 and indirect estimator 18.

Figure 8:
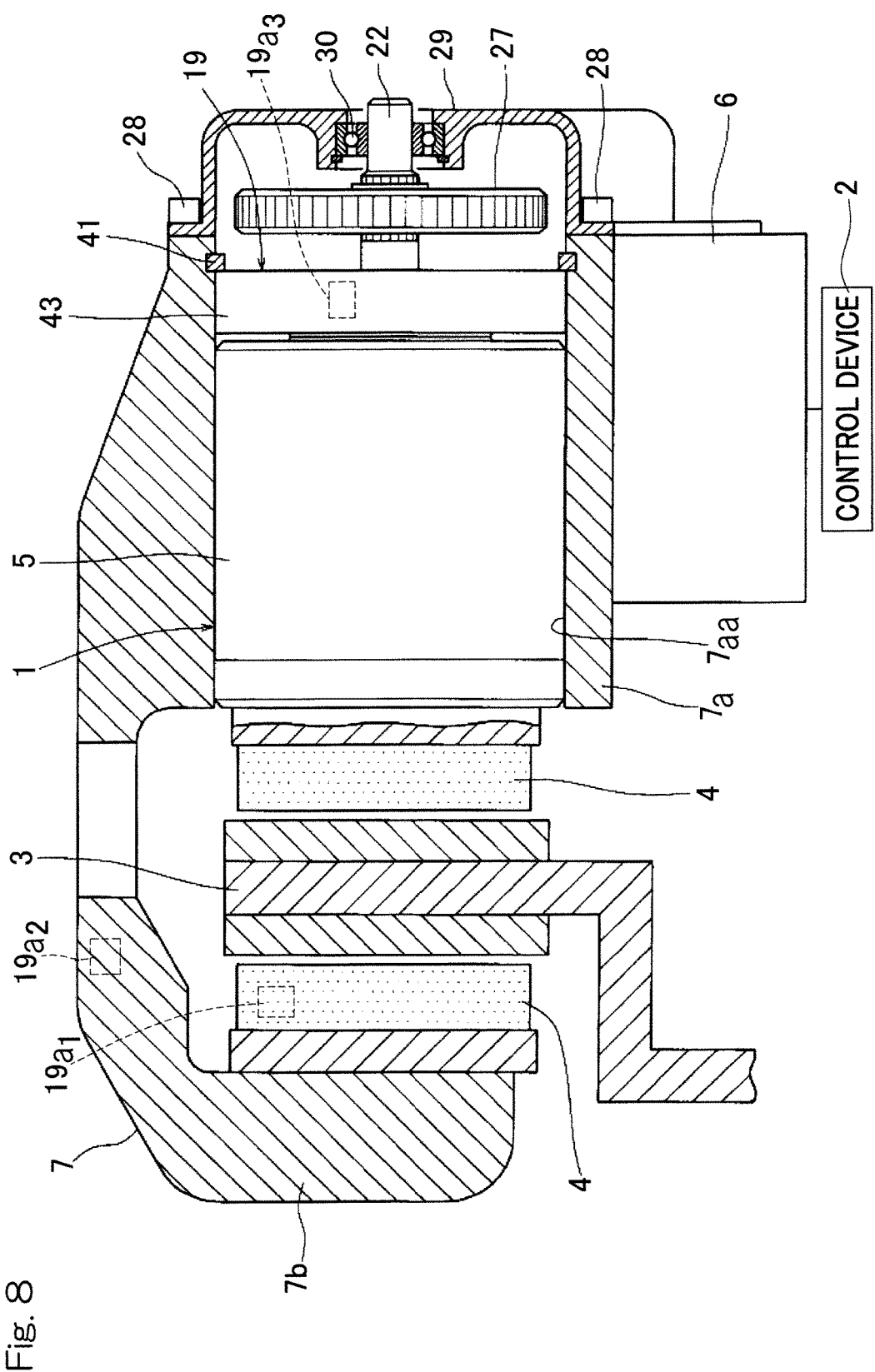
FIG. 8 is a side view showing an electric brake actuator in the electric brake device.
Figure 9:
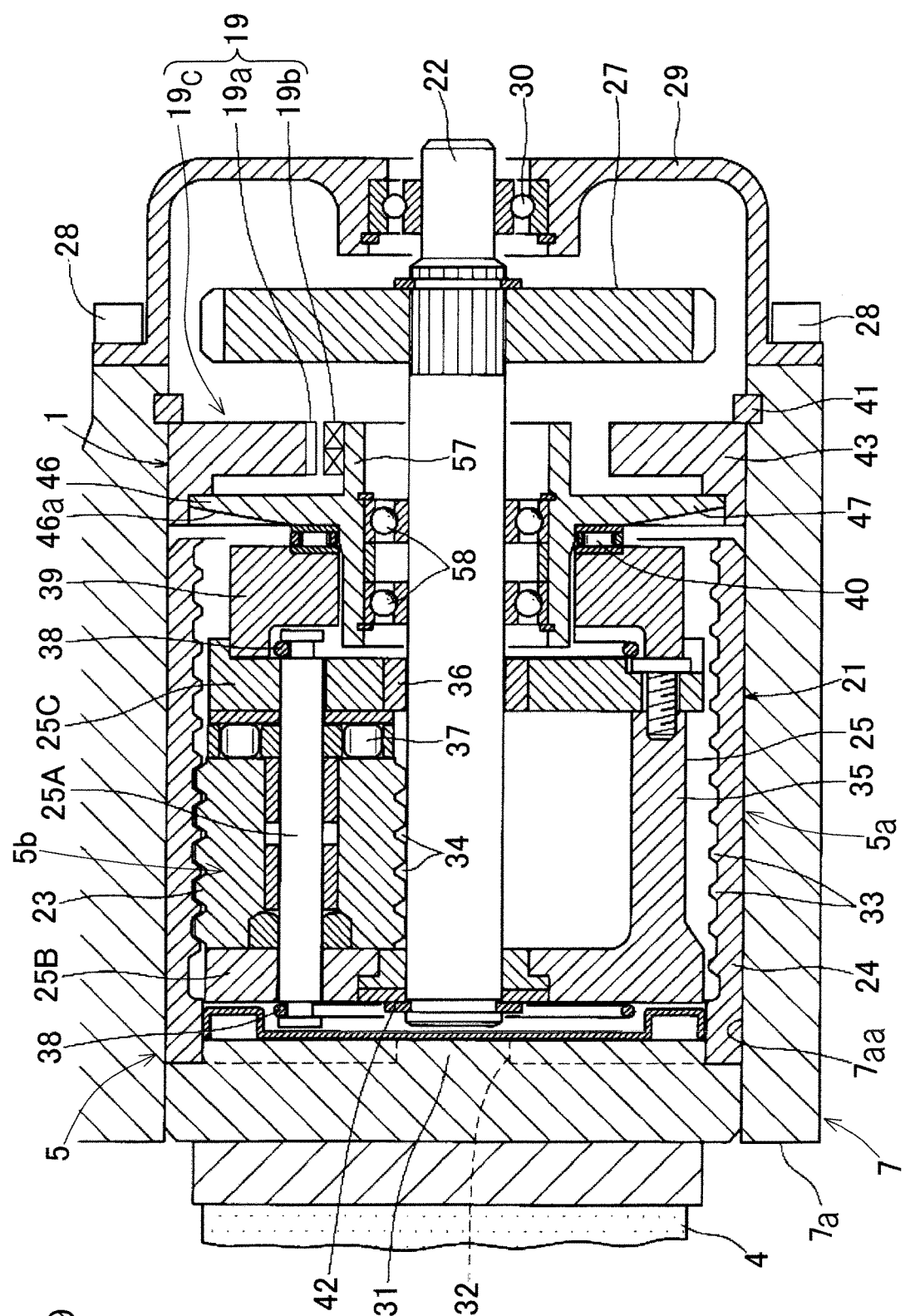
FIG. 9 is a side sectional view of the electric brake actuator.

The direct estimator 17 estimates the braking force from output of a sensor element 19a of a braking force sensor 19. For example, specifically, the direct estimator 17 is configured from a hardware circuit or a software function on a processor (not shown), that is capable of, from output of the sensor element 19a, converting output of the braking force sensor 19 into an estimated braking force and outputting the estimated braking force on the basis of a predetermined correlation, using the embodied model. As shown in FIG. 9, the sensor element 19a of the braking force sensor 19 is provided to a load member which is one of the friction members 4, the friction member operator 5, and a member such as the caliper body 7 supporting the friction members 4 or the friction member operator 5. The sensor element 19a is provided to a part such as the load member, i.e., a part where displacement or deformation such as distortion occurs due to the braking force or a part where a load varies due to the braking force, in any of mechanical constituting parts of the electric brake device. The sensor element 19a detects the displacement, the deformation, the load, or the like. For example, as shown in FIG. 8 in which the following respective arrangement examples are shown together on the same drawing, the sensor element 19a may be a sensor element $19a_1$ which is provided to the friction member 4 and detects distortion of the friction member 4, or a sensor element $19a_2$ which is provided to the caliper body 7 and detects distortion of the caliper body 7, or may be a sensor element $19a_3$ which detects displacement due to deformation of a member supporting the friction member operator 5.

In FIG. 1, the indirect estimator 18 estimates a braking force that is out of the detection range of the braking force sensor 19, on the basis of information other than output of the sensor element 19a of the braking force sensor 19, e.g., on the basis of output of the motor sensor 8. For example, specifically, the indirect estimator 18 is configured from a hardware circuit or a software function on a processor (not shown), that is capable of estimating and outputting the braking force (estimated braking force) in response to output of the motor sensor 8, using the embodied model having a correlation map or the like as described later. The motor sensor 8 is composed of the motor angle estimator 8a such as a motor angle sensor, or the current sensor 8b, for example.

That is, the indirect estimator 18 is configured to estimate the braking force on the basis of a motor rotation angle detected by the rotation angle estimator 8a, using a result of measurement of rigidity of the electric brake device, e.g., a specified relationship between the motor rotation angle and the braking force. Instead of the motor rotation angle, a rotation angle of an input shaft through which rotation is inputted to the electric motor 6 may be used. Other than these, the indirect estimator 18 may be configured to estimate the braking force on the basis of the value of motor current detected by the current sensor 8*b*, using a specified relationship between the motor current of the electric motor 6 and the braking force.

The braking force estimator 16 is configured such that the range in which the braking force is estimated by the direct estimator 17 is a specified low-braking-force range (e.g., 0.3 G or lower on a dry road), and in a range beyond this range, estimation of the braking force is performed by the indirect estimator 18.

Figure 3:
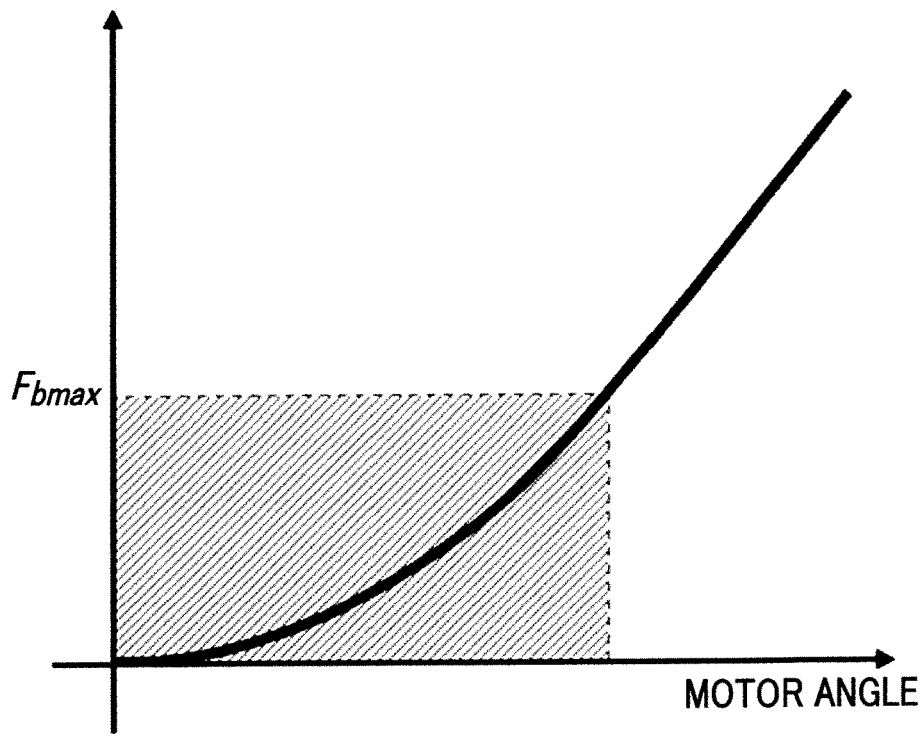
FIG. 3 is a graph showing an example of the relationship between a motor angle and a braking force in the electric brake device.

The indirect estimator 18 may perform estimation on the basis of a correlation obtained in advance through examination or the like, and such a correlation may be obtained on the basis of actual output transitions of the braking force sensor 19 and the motor sensor 8. For example, a correlation map as shown in FIG. 3 based on a correlation between the motor angle and the braking force, or the like, may be prepared in advance, and on the basis of a gradient in the vicinity of an upper limit value $F_{bmax}$ of a set range that is the specified low-braking-force range in FIG. 3, the subsequent correlation may be estimated. In addition, such methods may be used in combination.

Figure 2:
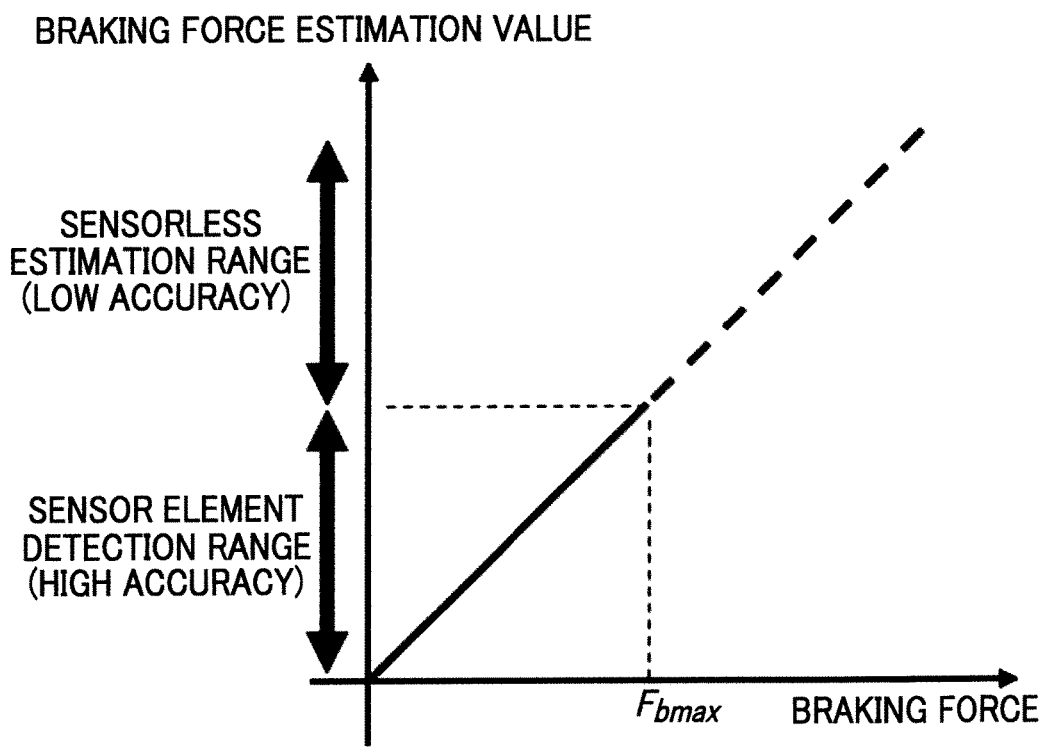
FIG. 2 illustrates an example of braking force estimation in the electric brake device.

Operation of the above configuration will be described. FIG. 2 shows an example of braking force estimation. A sensorless estimation range in FIG. 2 indicates the estimation range of the indirect estimator 18. A sensor element detection range in FIG. 2 indicates the detection range of the direct estimator 17. As described above, the braking force estimator 16 in FIG. 1 includes: the direct estimator 17 which performs detection on the basis of output of the braking force sensor 19; and the indirect estimator 18 not using the braking force sensor 19, and performs estimation for the entire braking force region, using both of the direct estimator 17 and the indirect estimator 18.

The sensor element 19*a* of the braking force sensor 19 in the example shown in FIG. 2 may have a small dynamic range as compared to the case of performing detection on the basis of output of the braking force sensor 19 over the entire range including the sensorless estimation range. In general, in a servo control system such as the electric brake device, a microcomputer or a DSP (Digital Signal Processor) such as FPGA (Field-Programmable Gate Array) is often used for calculation. In this case, the resolution of an A/D converter is equal to detection resolution, and therefore, the resolution of the braking force sensor 19 in the example shown in FIG. 2 can be made higher. In addition, in the above case, if it is sufficient that the sensor has an equivalent resolution or higher or if narrow-range detection as shown in FIG. 2 is sufficient, it is possible to, for example, alleviate or allow dimensional tolerance of sensor components or sensor attachment error thereof, whereby cost reduction can be achieved.

Figure 4:
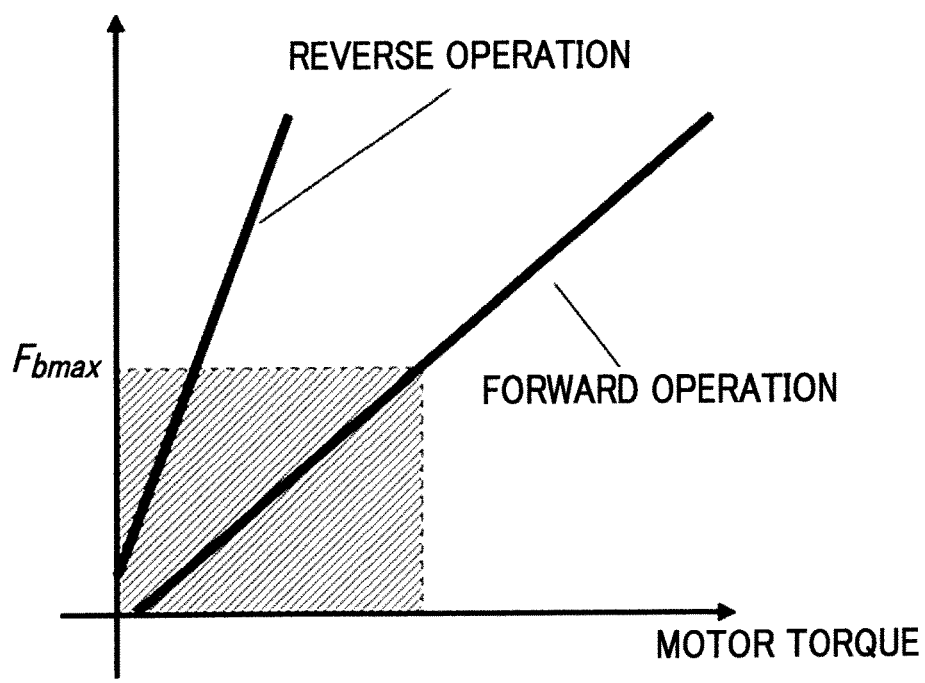
FIG. 4 is a graph showing an example of the relationship between a motor torque and a braking force in the electric brake device.

FIG. 3 and FIG. 4 show examples of correlations between each motor characteristic and the braking force. FIG. 3 shows an example based on a correlation between the motor rotation angle and the braking force. This correlation, i.e., rigidity of the electric brake device can be measured in advance before implementation. Alternatively, on the basis of the gradient of the braking force with respect to the motor angle before reaching to the set range upper limit value $F_{bmax}$ which is the upper limit value of the specified low-braking-force range, the subsequent values of the rigidity may be estimated and calculated. Here, in a region up to the set range upper limit value $F_{bmax}$ in the graph, detection is performed by the braking force sensor 19 (see FIG. 1), and in the subsequent region, estimation is performed using a LUT or a calculation formula based on the correlation shown in FIG. 3 by the indirect estimator 18 (see FIG. 1), whereby the motor is controlled so as to reach a desired motor rotation angle.

At this time, mainly due to non-linear rigidity of the friction members 4 (see FIG. 8), in general, a stronger non-linearity is exhibited in a region where the braking force is lower, and the rigidity in this region greatly varies depending on the wear state, the temperature, or the like of the friction members 4. Therefore, the following reasonable configuration can be employed: in a low-braking-force region in which it is difficult to perform estimation, estimation is performed with high accuracy by using the braking force sensor 19, and in a high-braking-force region in which it is comparatively easy to perform, estimation is covered by estimation based on the motor angle or the like by using the indirect estimator 18.

FIG. 4 shows an example based on a correlation between the motor torque and the braking force. This correlation, i.e., a torque conversion coefficient of the electric brake device can be measured in advance before implementation. Alternatively, the torque conversion coefficient may be estimated from the gradient of the braking force with respect to the motor torque before reaching to the set range upper limit value $F_{bmax}$. Here, in a region up to the set range upper limit value $F_{bmax}$ in the graph, detection is performed by the braking force sensor 19 (see FIG. 1), and in the subsequent region, estimation is performed using a LUT or a mathematical formula based on the correlation shown in FIG. 4, whereby control is performed so as to keep desired motor current. At this time, it is necessary to consider characteristics in which hysteresis is provided between a forward operation case of pressing the brake and a reverse operation case of reducing the pressure to the brake, as shown in FIG. 4. For example, in the case of pressing the brake to a predetermined braking force, the braking force of the electric brake device reaches approximately the predetermined braking force when a motor torque on the horizontal axis corresponding to the braking force on the vertical axis in the forward operation characteristics is outputted.

At this time, it is difficult to accurately grasp the correlation in a region in which mainly the proportions of frictional resistances of the bearing, the speed reducer, and the linear motion mechanism (screw, ball ramp, etc.) in the electric brake actuator 1 (see FIG. 8), cogging torque of the electric motor 6 (see FIG. 8), or the like are comparatively great relative to the motor torque, i.e., in a region in which the braking force and the torque are low. Therefore, the following reasonable configuration can be employed: in a low-brake region in which it is difficult to perform estimation, estimation is performed with high accuracy by using the braking force sensor 19, and in a high-brake region in which it is comparatively easy to perform, estimation is covered by indirect estimation based on the motor rotation angle, the motor current, or the like.

Figure 5:
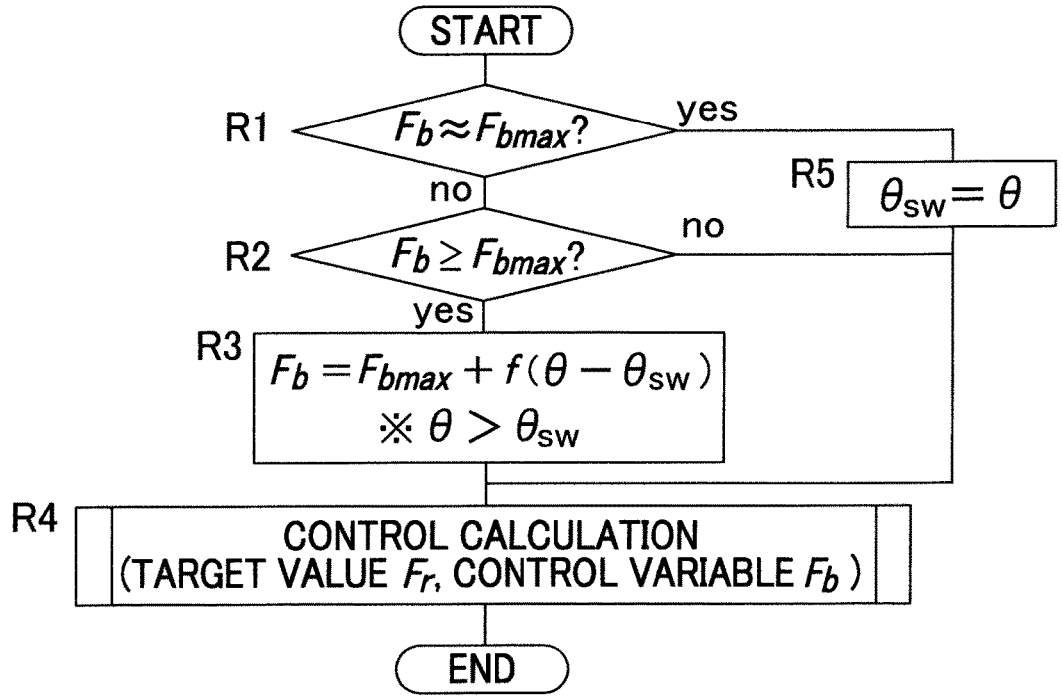
FIG. 5 is a flowchart showing an example of control operation of the electric brake device.
Figure 6:
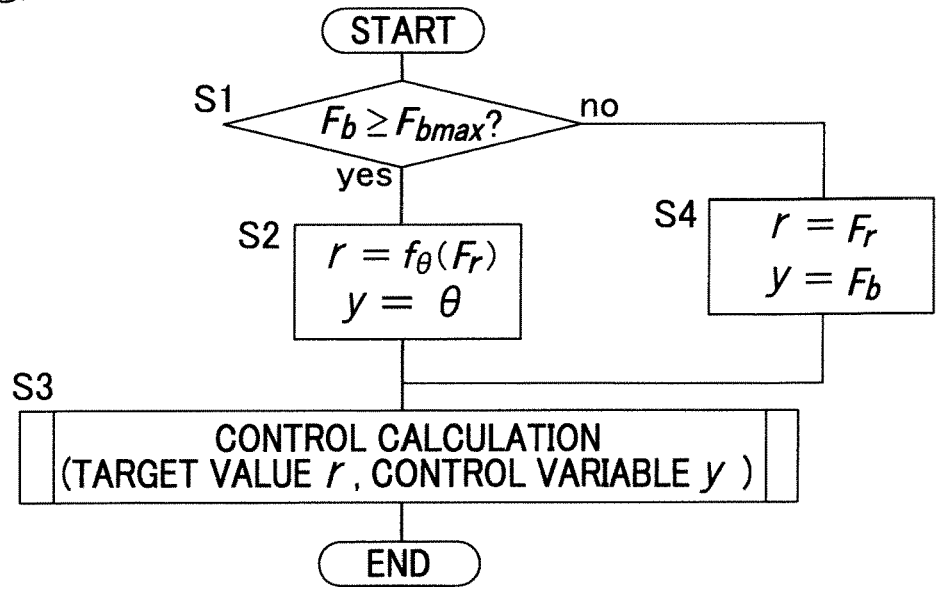
FIG. 6 is a flowchart showing another example of control operation of the electric brake device.
Figure 7:
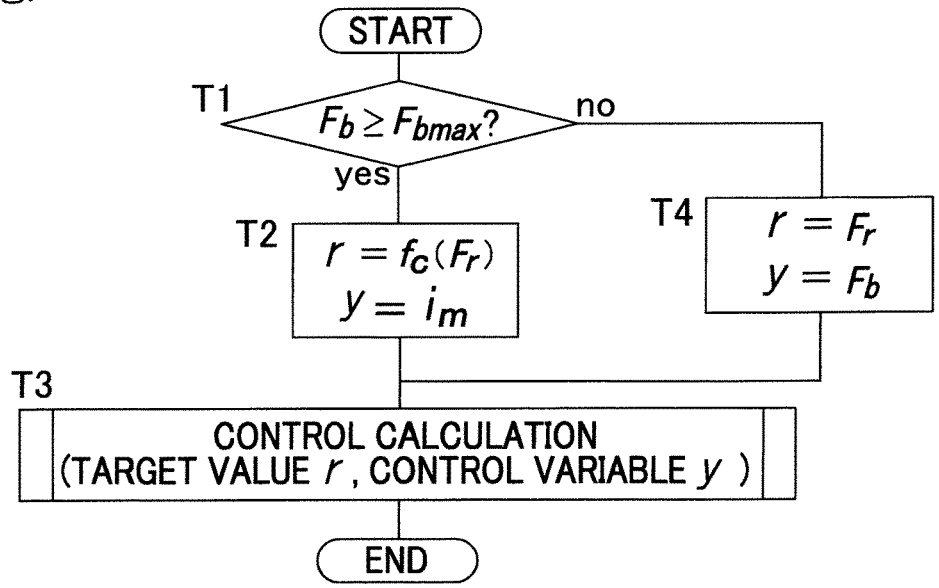
FIG. 7 is a flowchart showing still another example of control operation of the electric brake device.

FIG. 5 to FIG. 7 show examples of implementation flows of the present embodiment. FIG. 5 shows an example in which the braking force estimation value is interpolated using the motor rotation angle when the braking force estimation value exceeds the set range upper limit value $F_{bmax}$. At this time, it is preferable that the set range upper limit value $F_{bmax}$ is set to a value slightly smaller than the limit of sensing.

The operation in FIG. 5 is performed by the following procedure: an estimated braking force $F_b$ and the set range upper limit value $F_{bmax}$ are compared with each other (step R1); if they are substantially equal to each other (yes in step R1); the motor rotation angle $\theta_{SW}$ corresponding to the set range upper limit value $F_{bmax}$ is set as the motor rotation angle $\theta$ (step R5); and control calculation for the motor is performed (step R4). In this control calculation, the target value (target braking force) is $F_r$, and the control variable is the estimated braking force $F_b$.

In step R1, if the estimated braking force $F_b$ and the set range upper limit value $F_{bmax}$ are not substantially equal to each other (no in step R1), whether or not the estimated braking force $F_b$ is equal to or greater than the set range upper limit value $F_{bmax}$ is determined (step R2). Then, if the estimated braking force $F_b$ is not equal to or greater than the set range upper limit value $F_{bmax}$ (step R2: no), the control calculation (step R4) is performed. If the estimated braking force $F_b$ is equal to or greater than the set range upper limit value $F_{bmax}$ (step R2: yes), the estimated braking force $F_b$ is set as the set range upper limit value $F_{bmax}+f(\theta-\theta_{SW})$ (step R3), and then the control calculation (step R4) is performed.

FIG. 6 shows an example of switching to motor rotation angle control when the braking force estimation value exceeds the estimation range. In step S1, whether or not the estimated braking force $F_b$ is equal to or greater than the set range upper limit value $F_{bmax}$ is determined. Then, if the estimated braking force $F_b$ is equal to or greater than the set range upper limit value $F_{bmax}$, a target value r is set as $f_\theta(F_r)$ and a control variable y is set as $\theta$ (here, $F_r$ is the target braking force) (step S2), and the control calculation is performed (step S3). In this control calculation, the target value is r and the control variable is y. As a result of the determination in step S1, if the estimated braking force $F_b$ is not equal to or greater than the set range upper limit value $F_{bmax}$, the target value r is set as $F_r$ and the control variable y is set as the estimated braking force $F_b$ (step S4), and the control calculation (step S3) is performed.

FIG. 7 shows an example of switching to motor current control when the braking force estimation value exceeds the estimation range. In step T1, whether or not the estimated braking force $F_b$ is equal to or greater than the set range upper limit value $F_{bmax}$ is determined. Then, if the estimated braking force $F_b$ is equal to or greater than the set range upper limit value $F_{bmax}$, the target value r is set as $f_c(F_r)$ and the control variable y is set as $i_m$ ($i_m$: motor current, $F_r$: target braking force) (step T2), and the control calculation is performed (step T3). In this control calculation, the target value is r and the control variable is y. As a result of the determination in step T1, if the estimated braking force $F_b$ is not equal to or greater than the set range upper limit value $F_{bmax}$, the target value r is set as $F_r$ and the control variable y is set as the estimated braking force $F_b$ (step T4), and the control calculation (step T3) is performed.

As described above, the electric brake device of the present embodiment makes it easy to configure a braking force sensor having a sufficient resolution in a normal-use region, and enables control accuracy improvement and cost reduction.

In the electric brake device configured as described above, as shown in FIG. 1, a calibrator 20 shown below may be provided. According to the calibrator 20, when the speed of a vehicle to which the electric brake device is mounted is equal to or smaller than a predetermined value (e.g., a speed substantially regarded as stoppage, or a speed approximately equal to a person's walking speed), the electric motor 6 is automatically activated, and calibration for the indirect estimator 18 is performed on the basis of a relationship between the estimated braking force estimated by the direct estimator 17 and at least one of the motor rotation angle of the electric motor 6 and the motor current of the electric motor 6 during the activation.

A relationship between the motor rotation angle, the motor current, or the like, and the braking force can vary due to wear of the friction member, wear or deformation of each component, other changes over time, or the like. Therefore, by providing the calibrator 20 to perform calibration for the indirect estimator 18, accuracy of braking force estimation by the indirect estimator 18 can be always maintained. The calibrator 20 performs calibration using a braking force detected by the direct estimator 17 while the electric brake device is activated. Therefore, the calibration can be performed with high accuracy, and the estimated braking forces obtained by the direct estimator 17 and the indirect estimator 18 can be prevented from deviating from each other. At this time, if activation of the electric brake device for calibration is performed when the vehicle speed is equal to or smaller than a predetermined value, e.g., in a state in which the vehicle is at stoppage, calibration can be performed without causing any obstacle to the vehicle travelling, and therefore such a configuration is preferable.

Next, a specific example of the electric brake actuator 1 of the electric brake device in FIG. 8 will be described with reference to FIG. 9. In this example, the friction member operator 5 has a linear motion mechanism 5a and a planetary-mechanism-type speed reducing machine or speed reducer 5b. The linear motion mechanism 5a includes: a rotary shaft 22; a plurality of planetary rollers 23 which roll around and contact with the outer-circumferential cylindrical surface of the rotary shaft 22; an outer ring member 24 provided so as to surround these planetary rollers 23; a carrier 25 holding the planetary rollers 23 so as to allow rotation and revolution thereof; and the braking force sensor 19 formed from a magnetic-type load sensor and arranged at the rear in the axial direction (rotary shaft 22 direction) of the outer ring member 24.

The rotary shaft 22 is rotationally driven by rotation of the electric motor 6 shown in FIG. 8 being inputted via a gear 27 in FIG. 9. The rotary shaft 22 is inserted in a storage hole 7aa formed so as to penetrate the opposing portion 7a in the axial direction, such that one end of the rotary shaft 22 protrudes out from an opening on the rear side in the axial direction of the storage hole 7aa. The gear 27 is spline-fitted to the part protruding from the storage hole 7aa so as to prevent rotation. The gear 27 is covered by a cover 29 fixed with bolts 28 so as to close the opening on the rear side in the axial direction of the storage hole 7aa. A bearing 30 rotatably supporting the rotary shaft 22 is mounted to the cover 29.

The planetary rollers 23 roll around and contact with the outer-circumferential cylindrical surface of the rotary shaft 22, and when the rotary shaft 22 rotates, the planetary rollers 23 also rotate owing to friction between the planetary rollers 23 and the rotary shaft 22. A plurality of the planetary rollers 23 are provided at regular intervals in the circumferential direction of the rotary shaft 22.

The outer ring member 24 is stored in the storage hole 7aa provided in the opposing portion 7a of the caliper body 7, and is supported slidably in the axial direction in the inner circumference of the storage hole 7aa. An engagement recess 32 to be fitted to an engagement projection 31 formed at the back surface of the friction member 4 is formed at the front end in the axial direction of the outer ring member 24, and the engagement between the engagement projection 31 and the engagement recess 32 prevents the outer ring member 24 from rotating relative to the caliper body 7.

A spiral projection thread 33 is provided on the inner circumference of the outer ring member 24, and circumferential grooves 34 to be fitted to the spiral projection thread 33 are provided on the outer circumferences of the planetary rollers 23. Thus, when the planetary rollers 23 rotate, the spiral projection thread 33 of the outer ring member 24 is guided by the circumferential grooves 34 so that the outer ring member 24 moves in the axial direction. Here, the circumferential grooves 34 having a lead angle of 0 degrees are provided on the outer circumferences of the planetary rollers 23. However, instead of the circumferential grooves 34, spiral grooves having a lead angle different from that of the spiral projection thread 33 may be provided.

The carrier 25 is composed of: carrier pins 25A rotatably supporting the planetary rollers 23; an annular carrier plate 25B holding the front ends in the axial direction of the carrier pins 25A at regular intervals in the circumferential direction (around the rotary shaft 22); and an annular carrier body 25C holding the rear ends in the axial direction of the carrier pins 25A at regular intervals in the circumferential direction (around the rotary shaft 22). The carrier plate 25B and the carrier body 25C are opposed to each other in the axial direction around the planetary rollers 23 therebetween, and are connected via connection bars 35 arranged between the adjacent planetary rollers 23 in the circumferential direction.

The carrier body 25C is supported by the rotary shaft 22 via a slide bearing 36, and is rotatable relative to the rotary shaft 22. A thrust bearing 37 for blocking transmission of rotation of the planetary roller 23 to the carrier body 25C is mounted between the planetary roller 23 and the carrier body 25C.

The carrier pins 25A are urged inward in the radial direction by reduced diameter ring springs 38 provided so as to be circumscribed to the plurality of carrier pins 25A arranged at some intervals in the circumferential direction of the rotary shaft 22. By the urging forces of the reduced diameter ring springs 38, the outer circumferences of the planetary rollers 23 are pressed to the outer circumference of the rotary shaft 22, whereby sliding between the rotary shaft 22 and the planetary rollers 23 is prevented. In order to exert the urging forces of the reduced diameter ring springs 38 over the entire lengths in the axial direction of the planetary rollers 23, the reduced diameter ring springs 38 are provided at opposite ends of the carrier pins 25A.

The braking force sensor 19 is a magnetic-type load sensor, and is fitted in the storage hole 7aa, in a direction in which a support member 43 is opposed, at the rear of a flange portion 46 of a load input member 47 in the rotary shaft 22 direction. A spacer 39 which revolves integrally with the carrier 25, and a thrust bearing 40 for transmitting an axial-direction load between the spacer 39 and a sensor mechanism portion 19c of the braking force sensor 19, are provided between the carrier 25 and the braking force sensor 19. The thrust bearing 40 is provided in contact with the inner-diameter-side part of the flange portion 46 of the load input member 47, and an axial-direction load is inputted from the spacer 39 to the inner-diameter-side part of the flange portion 46 via the thrust bearing 40. The rotary shaft 22 is rotatably supported by bearings 58 mounted in a cylindrical portion 57 of the load input member 47.

The outer circumferential edge of the support member 43 is locked by a stopper ring 41 mounted on the inner circumference of the storage hole 7aa, whereby axial-direction rearward movement of the sensor mechanism portion 19c of the braking force sensor 19 is regulated. The braking force sensor 19 is configured to support the carrier body 25C in the axial direction via the spacer 39 and the thrust bearing 40, thereby regulating axial-direction rearward movement of the carrier 25. In addition, axial-direction frontward movement of the carrier 25 is also regulated by a stopper ring 42 mounted at the front end in the axial direction of the rotary shaft 22. Thus, axial-direction frontward movement and axial-direction rearward movement of the carrier 25 are both regulated, and axial-direction movement of the planetary rollers 23 held by the carrier 25 is also regulated.

In the braking force sensor 19 in FIG. 9, a sensor target 19b such as a permanent magnet is provided to one of parts that move relatively to each other in the axial direction as described above, and the sensor element 19a formed from a magnetic sensor is provided to the other part, whereby the relative movement amount thereof in the axial direction is detected as a load value.

The load sensor composing the braking force sensor 19 may be configured using a capacitance sensor, a reluctance detection sensor, an optical sensor, or the like, instead of a magnetic-type sensor.

Although the preferred modes for carrying out the present invention have been described on the basis of the embodiments with reference to the drawings, the embodiments disclosed herein are, in all aspects, illustrative and not restrictive. The scope of the present invention is indicated by claims, not by the above description. Those skilled in the art will readily conceive numerous changes and modifications within the framework of obviousness upon the reading of the specification herein presented of the present invention. Accordingly, such changes and modifications are to be construed as included in the scope of the invention defined by claims or in a scope equivalent thereto.

REFERENCE NUMERALS

1 . . . electric brake actuator
2 . . . control device
3 . . . brake rotor
4 . . . friction member
5 . . . friction member operator
6 . . . electric motor
8a . . . rotation angle estimator
8b . . . current sensor
11 . . . high-order ECU
16 . . . braking force estimator
17 . . . direct estimator
18 . . . indirect estimator
19 . . . braking force sensor
19a . . . sensor element
20 . . . calibrator

What is claimed is:

1. An electric brake device comprising:
a brake rotor;
a friction member;
a friction member operator configured to bring the friction member into contact with the brake rotor;
an electric motor configured to drive the friction member operator;
a rotation angle estimator configured to estimate a motor rotation angle of the electric motor;

a braking force estimator configured to estimate a braking force; and
a control device configured to control the braking force by use of the electric motor so as to achieve a target braking force,
wherein the braking force estimator includes:
- a direct estimator configured to convert, into an estimated braking force, output of a braking force sensor which detects a load or displacement corresponding amount acting on one of the friction member, the friction member operator, and a member supporting the friction member or the friction member operator; and
- an indirect estimator configured to estimate the braking force on the basis of information other than the output of the braking force sensor, and
wherein a range below a predetermined threshold value in which the braking force is only estimated by the direct estimator is a specified low-braking-force range, and in a specified high-braking-force range above the predetermined threshold value and beyond the specified low-braking-force range, estimation of the braking force is only performed by the indirect estimator.

2. The electric brake device as claimed in claim 1, wherein
the indirect estimator estimates the braking force, using a specified relationship between the motor rotation angle and the braking force, on the basis of the motor rotation angle detected by the rotation angle estimator.

3. The electric brake device as claimed in claim 1, wherein
the indirect estimator estimates the braking force, using a specified relationship between motor current of the electric motor and the braking force, on the basis of a value of the motor current detected by a current sensor.

4. The electric brake device as claimed in claim 1, wherein
the braking force sensor detects an amount of displacement of one of the friction member, the friction member operator, and the member supporting the friction member or the friction member operator due to a contact force between the friction member and the brake rotor.

5. The electric brake device as claimed in claim 1, further comprising a calibrator configured to perform calibration for the indirect estimator on the basis of a relationship between the estimated braking force estimated by the direct estimator and at least one of the motor rotation angle and motor current of the electric motor.

6. The electric brake device as claimed in claim 5, wherein
when a speed of a vehicle to which the electric brake device is mounted is equal to or smaller than a predetermined value, the electric motor is activated not depending on a command from an operator of the vehicle, and calibration for the indirect estimator is performed on the basis of the calibrator.

* * * * *